(12) United States Patent
Vail

(10) Patent No.: US 8,134,075 B1
(45) Date of Patent: Mar. 13, 2012

(54) CORD CONNECTOR AND WIRE ORGANIZER

(76) Inventor: Susan Vail, Port Hueneme, CA (US)

( * ) Notice: Subject to any disclaimer, the term of this patent is extended or adjusted under 35 U.S.C. 154(b) by 245 days.

(21) Appl. No.: 12/655,411

(22) Filed: Dec. 29, 2009

(51) Int. Cl.
*H01B 7/00* (2006.01)

(52) U.S. Cl. ..... 174/135; 174/154; 439/371; 312/223.6; 211/106; 248/129

(58) Field of Classification Search ............ 174/135, 174/154; 439/371, 450, 650, 501, 502, 4; 312/223.6; 248/129; 242/388; 211/106; 191/12 R See application file for complete search history.

(56) References Cited

U.S. PATENT DOCUMENTS

| | | | |
|---|---|---|---|
| 3,290,453 A * | 12/1966 | Jensen | 191/12.4 |
| 4,353,613 A * | 10/1982 | Carlow | 439/501 |
| 4,731,029 A | 3/1988 | Lerner et al. | |
| 4,882,453 A | 11/1989 | Chelsea | |
| 4,944,694 A | 7/1990 | Dorn | |
| 5,457,600 A | 10/1995 | Campbell et al. | |
| 5,596,479 A | 1/1997 | Campbell et al. | |
| 5,779,366 A | 7/1998 | McKenzie, III et al. | |
| 5,924,892 A | 7/1999 | Ferracina | |
| 5,961,062 A | 10/1999 | Beihl | |
| 6,017,228 A | 1/2000 | Verbeek et al. | |
| 6,163,465 A | 12/2000 | Tanner et al. | |
| D445,766 S | 7/2001 | Solomon | |
| 6,278,063 B1 | 8/2001 | Conrad | |
| 6,284,980 B1 * | 9/2001 | Filus et al. | 174/135 |
| 6,406,327 B1 | 6/2002 | Soon | |
| 6,619,980 B1 | 9/2003 | Hsiao | |
| 6,805,581 B2 | 10/2004 | Love | |
| 6,844,494 B1 | 1/2005 | Nevins | |
| 7,004,786 B1 | 2/2006 | Bloom et al. | |
| 7,025,627 B2 | 4/2006 | Rosenthal et al. | |
| 7,098,406 B1 | 8/2006 | Hammonds | |
| 7,172,456 B1 | 2/2007 | Nagy | |
| 7,247,798 B2 * | 7/2007 | Pagoto et al. | 174/138 E |
| 7,431,610 B2 * | 10/2008 | Laursen | 439/501 |
| 7,459,636 B2 * | 12/2008 | Conrad | 174/135 |
| 2002/0127906 A1 | 9/2002 | Soon | |

FOREIGN PATENT DOCUMENTS

GB 2318920 5/1998

* cited by examiner

*Primary Examiner* — Dhirubhai R Patel
(74) *Attorney, Agent, or Firm* — Sandy Lipkin

(57) ABSTRACT

A wire organizer providing an accommodation for power supplies, an attractive and compact compartment, and an easy and unlimited variety of adaptations to suit the user's purpose, having an attractive top cover and a functional main panel on which a multiplicity of hook and loop fasteners have been placed in strategic positions, so as to retain in a neat and organized fashion a multiplicity of wires and cords, power supplies and power strips, all having mating hook and loop fasteners to connect to those of the main panel, and a means by which the organizer may be hung either vertically or horizontally.

11 Claims, 4 Drawing Sheets

CORD CONNECTOR AND WIRE ORGANIZER

BACKGROUND OF THE INVENTION

1. Field of the Invention

The present invention relates to an organizer for wires, cords, cables, connectors, tubes, and power supplies, and more particularly toward a systematic, orderly and functional handling for wires, cords, cables, connectors, tubes and power supplies for the home or business office.

2. Description of the Prior Art

With the growth of audio, computing, video and office equipment, in the home and at the office, comes the growth of cords, wires, cables, connectors, plugs, tubes, power supplies and power strips associated with the equipment, as each device typically includes at least one power cord, sometimes connected to a power supply, in addition to a connecting signal cable or connector, and, generally an extension cord or power strip. An assemblage of more than one device and accessory results in a conglomeration of cordage on the desk or table and floor. The aggregation of wires and cords is unsightly, occupies a lot of room, and poses a safety hazard. Power strips are commonly used as both a means to extend the power supply from the wall socket to a position closer on the floor to the devices and as a means to power more than two devices at a time. However, this falls short of addressing the need to keep the cables neat, untangled, close at hand and out of sight.

A number of solutions for managing cords, cables, and wires exist in the prior art. Prior art organizers pertaining to electrical wires generally consist of multiple sockets or power strips, sometimes having a spool around which the wires wrap. These organizers are not convenient as when the cord or wire needs to be removed, it must first be unwrapped from around the spool before the device can be unplugged. In some cases, the prior art teaches a common spool around which all the wires are wrapped, which must be untangled and unwrapped prior to removal. Other prior art teaches that the cords and wires must be extricated upon removal. Most prior art does not accommodate power supplies and battery packs, which must sit on the floor or occupy a lot of space in the device or elsewhere. While the prior art may hide the mess, the cords and wires are not truly organized and do not have a convenient means to plug in/out and separate all the wires. Problems common in all the prior art include that the devices are bulky, unsightly, ungainly, and occupy a substantial area of the floor or the desk.

SUMMARY OF THE INVENTION

To resolve the problems of the prior art, the present invention is a unique and innovative combination of a device which provides ease of addition and removal of wires, an accommodation for power supplies, an attractive and compact compartment, and provides an easy and unlimited variety of adaptations to suit the user's purpose.

The preferred embodiment teaches an electronic cordage organizer comprising: a main panel, said main panel having an interior surface, an exterior surface, a top horizontal side, a bottom horizontal side, a first vertical side and a second vertical side; a first protrusion having an interior surface and an exterior surface extending from said first vertical side and said top horizontal side extending in an orientation substantially perpendicular to said main panel; a second protrusion having an interior surface and an exterior surface extending from said second vertical side and said top horizontal side extending in an orientation substantially perpendicular to said main panel; a first fastening means located on said exterior surface of said first protrusion; a second fastening means located on said exterior surface of said second protrusion; a multiplicity of horizontally oriented straps having a first end and a second end, said straps containing fastening means on either side, said multiplicity of horizontally oriented strips being located substantially along said first vertical side and said second vertical side; a shelf that protrudes out from said interior surface of said main panel in an orientation substantially perpendicular to said main panel; a first vertically oriented strap that extends from said shelf upward toward said top horizontal side through an aperture in said main panel; an aperture located below said shelf for the placement therethrough of a power strip that connects directly to a power outlet; and a hanging means.

The above embodiment can be further modified to define that there is a second vertically oriented strap that extends from said first vertically oriented strap toward said top horizontal side and attaching thereto through an attachment means;

The above embodiment can be further modified to define that the fastening means on said first and second protrusions is taken from the group including: hook and loop fasteners, snaps buttons and buckles.

The above embodiment can be further modified to define that the fastening means on said horizontal straps are taken from the group including: hook and loop fasteners, snaps buttons and buckles hook and loop fasteners.

The above embodiment can be further modified to define that the attachment means on said second vertical strap is taken from the group including: hook and loop fasteners, snaps buttons and buckles.

The above embodiment can be further modified to define that the hanging means for said organizer is one or more apertures for the placement therethrough of screws or nails for fastening to an external surface.

The above embodiment can be further modified to define that the hanging means for said organizer is an adhesive.

The above embodiment can be further modified to define that the hanging means for said organizer is a hook and loop system.

The above embodiment can be further modified to define that a cover is attached to said organizer to said first and second fastening means located on said exterior surfaces of said first and second protrusions.

The above embodiment can be further modified to define that the cover is made of a material that is fire and heat resistant.

The above embodiment can be further modified to define that the cover is decorative.

BRIEF DESCRIPTION OF THE DRAWINGS

This invention can better be understood by reference to the drawings, provided for exemplary purposes, and in which.

DETAILED DESCRIPTION OF A PREFERRED EMBODIMENT

Figure 1:
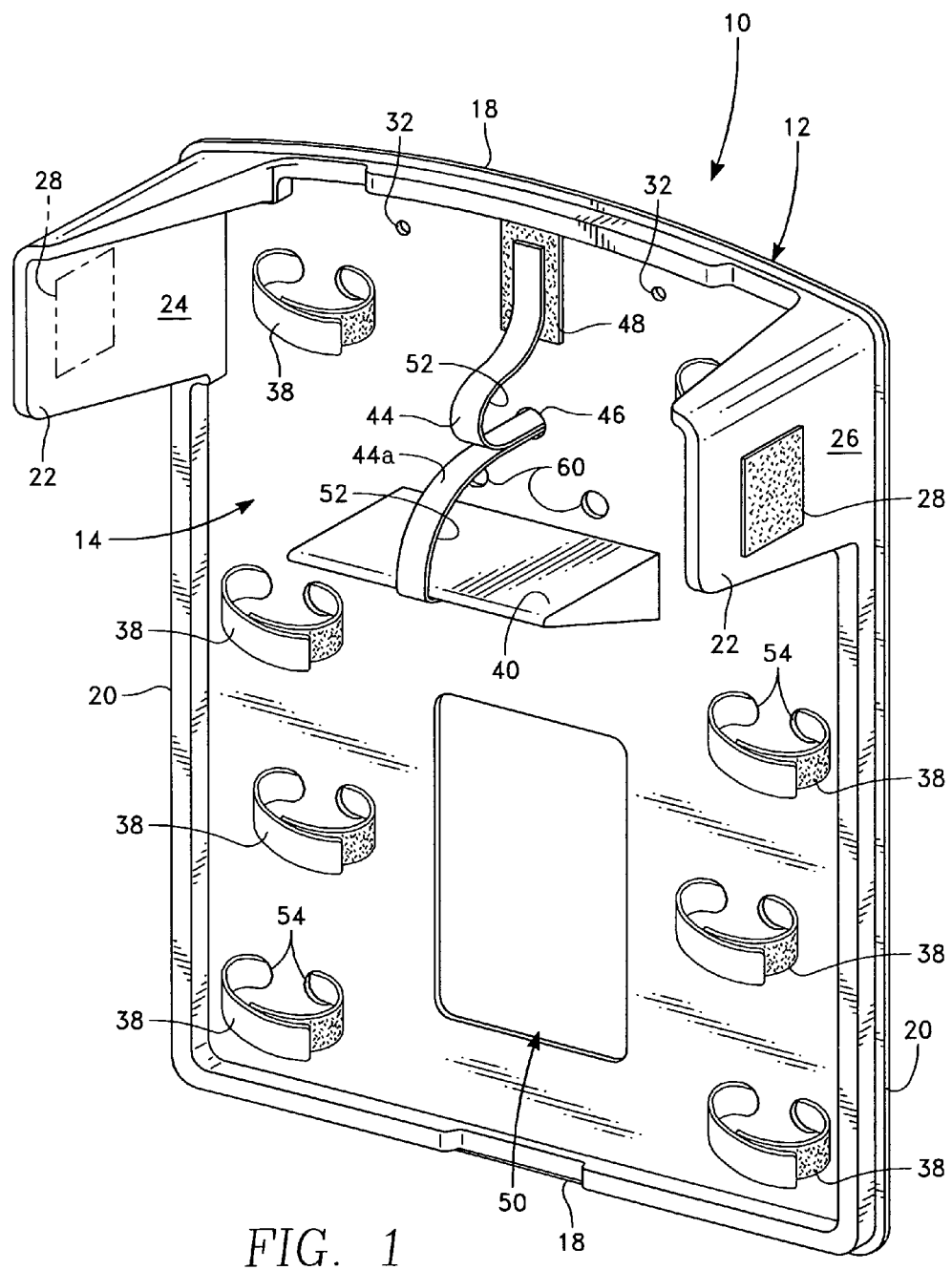
FIG. 1 is a perspective view of the interior surface of the main panel in accordance with the preferred embodiment of the present invention.
Figure 2:
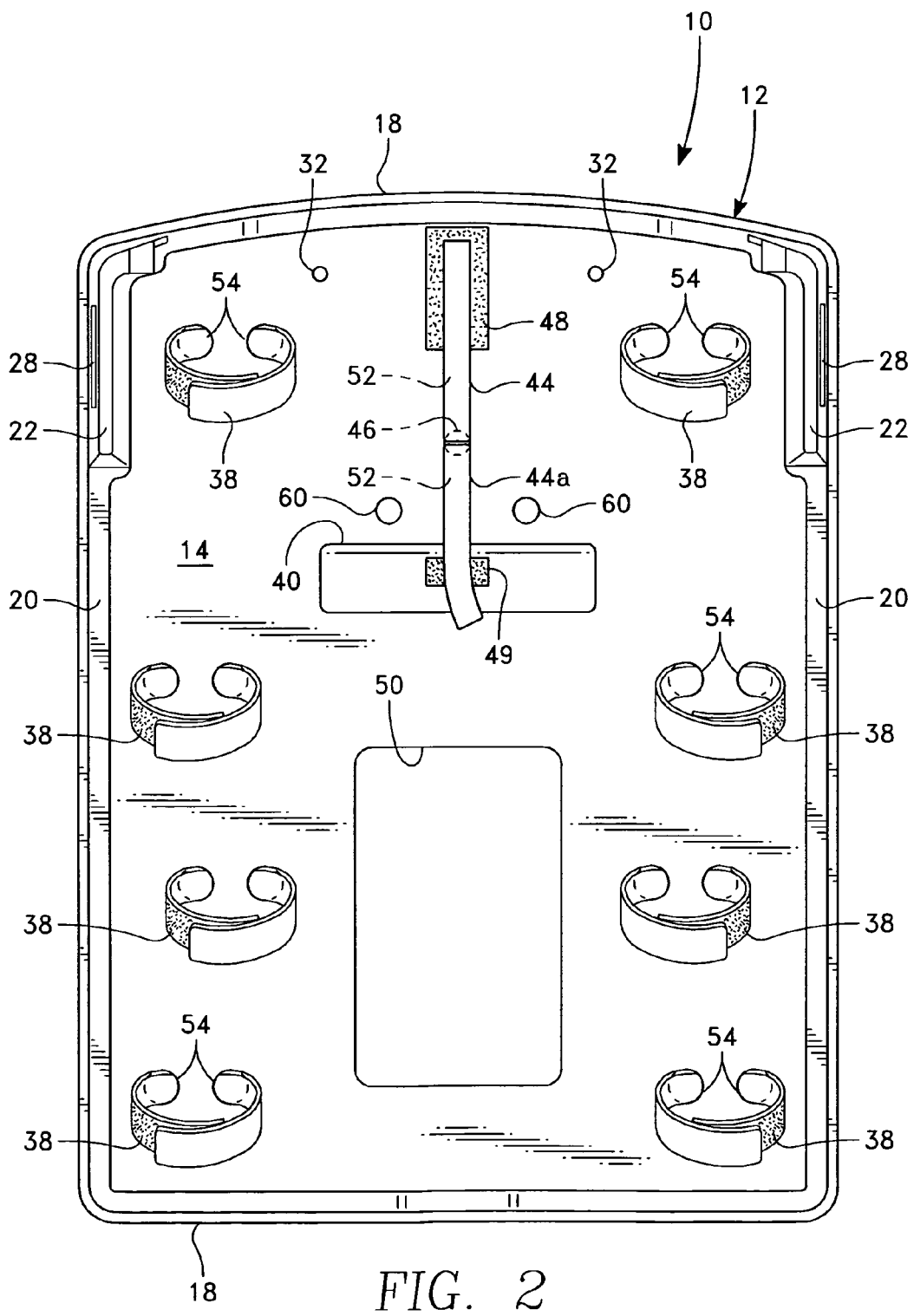
FIG. 2 is a front plan view of the interior surface of the main panel in accordance with the preferred embodiment of the present invention.

The preferred embodiment of the invention is illustrated in the attached figures. FIGS. 1-4 illustrate the organizer 10 of the instant invention. The organizer 10 includes a main panel 12 that has an interior surface 14 and an exterior surface 16. The main panel is generally rectangular in shape but need not have this exact shape. It is generally longer than wide. The length can be adjusted to accommodate a variety of sizes of power strips.

The main panel 12 has two horizontal sides 18 and two vertical sides 20. At the upper end of the vertical sides 20 and corresponding with the top horizontal side 18 are a pair of protrusions 22 that extend outward from the interior surface 14. These protrusions 22 include an interior surface 24 and an exterior surface 26. On the exterior surface 26 are hook and loop fastener pads 28 that attach to a mating hook and look fastener found on the cover 30 of the instant invention.

Figure 3:
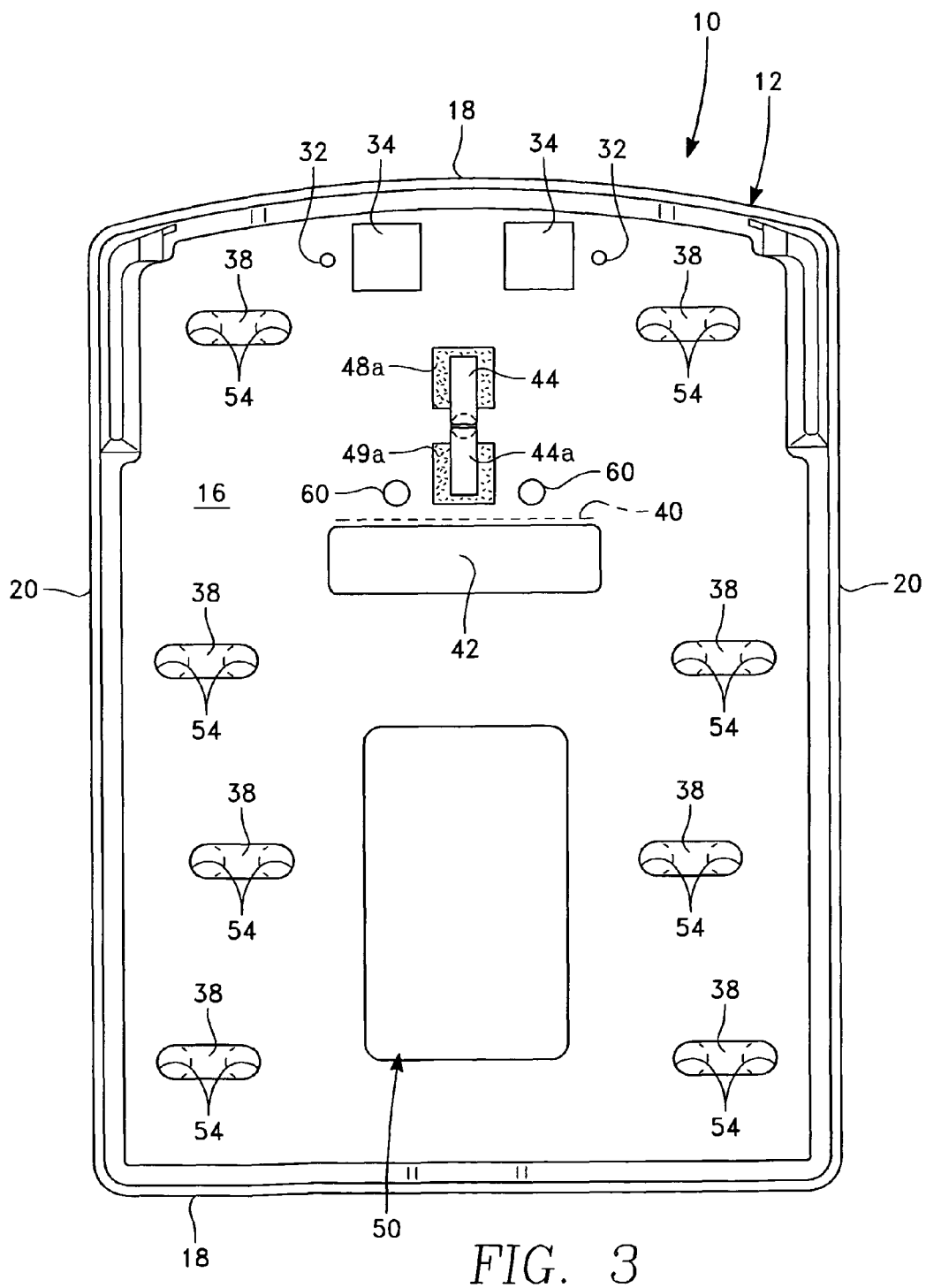
FIG. 3 is rear plan view of the exterior surface of the main panel in accordance with the preferred embodiment of the present invention.
Figure 4:
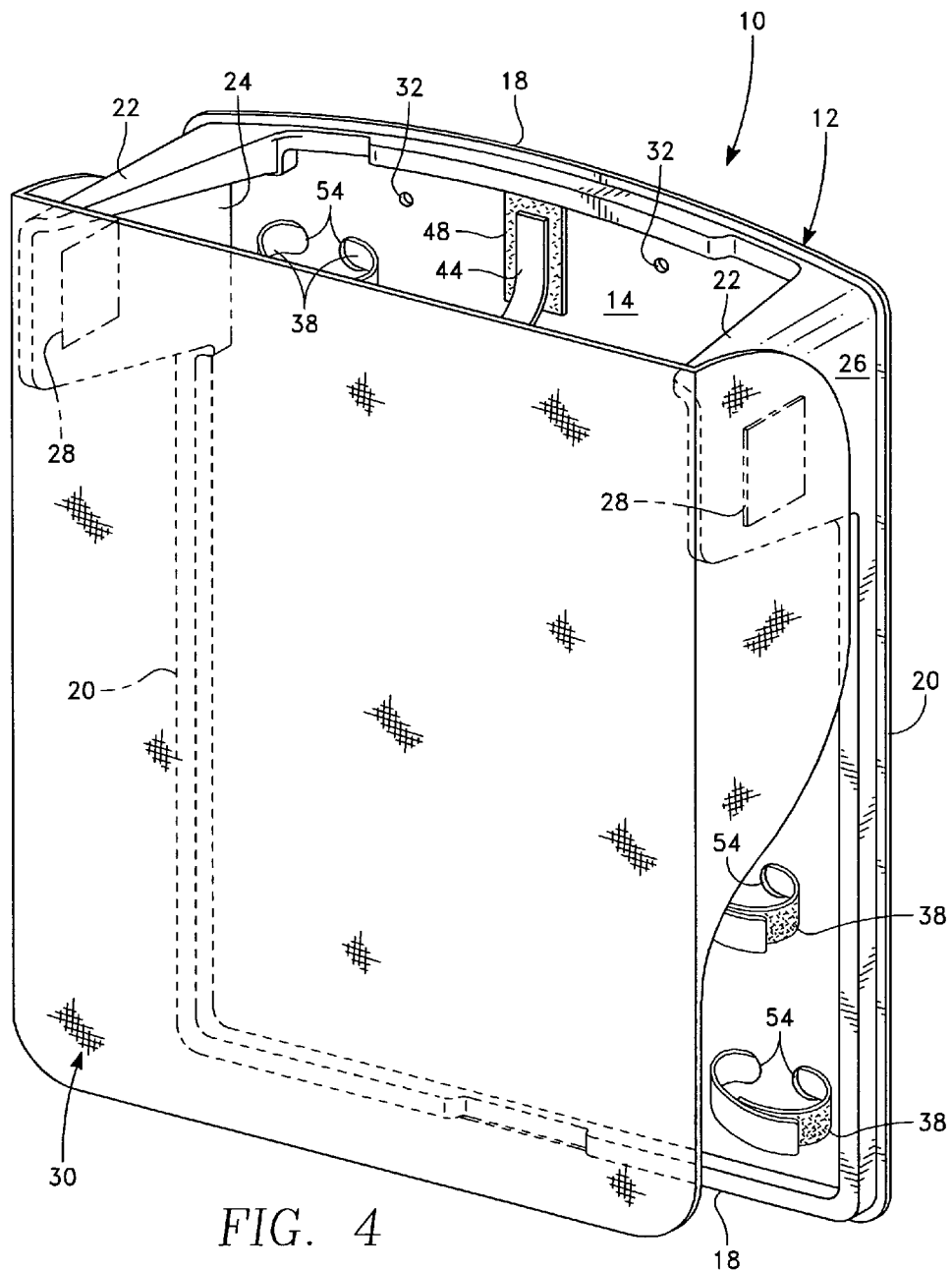
FIG. 4 is a perspective view of the interior surface of the main panel in accordance with the preferred embodiment of the present invention with the cover attached.

Near the center of the main panel 12 and toward the top are a pair of apertures 32 that allow for the inclusion therethrough of a pair of screws or nails for easy fastening of the organizer 10 to a wall or other surface. As seen in FIG. 3, on the exterior surface 16 there are also one or more pads 34 that are temporarily or permanently affixed to the exterior surface 16 that are adhesive so that when utilized, either through an adhesive or hook and hoop fastener, the organizer 10 can be affixed to an exterior surface.

Along the vertical sides 20 of the main panel 12 are a multiplicity of horizontally oriented straps 38 that open and close using a hook and loop mechanism. It is to be understood that other fastening mechanisms, such as snaps, buckles, buttons, etc. can also be used. Various cordage is to be wrapped and stored in these straps for tidy containment.

Positioned in the upper portion of the main panel 12 and toward the center is a shelf 40 that protrudes out from the interior surface 14 of the main panel 12. This shelf 40 is supported through the main panel as it extends through the exterior surface slightly 42. Above this shelf 40 are vertically oriented straps 44, 44a. The bottom strap 44a wraps around the shelf 40 in a vertical direction and extend through an aperture 46 in the main panel 12 from the interior surface 14 to the exterior surface 16. The bottom strap is secured to the shelf 40 through a hook and loop attachment means 49 found on the bottom of the shelf 40. It extends through the aperture 46 and attaches to a hook and loop attachment means 49a on the exterior panel 16 of the main panel 12. The top vertically oriented strap 44 extends from the exterior surface 16 of the main panel 12 where it first attaches to an attachment means 48a (hook and loop system) and then extends from the aperture 46 through the exterior panel 16 to the interior panel 14 and attaches to a hook and loop pad 48 located near the top horizontal side 18 of the interior surface 14 of the main panel 12. In the space between these loops 52 transformers from a variety of electronic equipment can be placed one on top of the other. It is to be understood that this orientation is not limited to two straps and could accommodate as many transformers as desired by the inclusion of more loops and more apertures. Above the shelf 40 are positioned one or more apertures 60 to allow for ventilation if and when transformers positioned therein become overheated.

Located below the shelf 40 is a large opening 50, substantially rectangular in shape for the placement therein of a power strip. The preferred embodiment is designed so that the type of power strip that plugs straight from its back into the wall is preferred. This space can be of any size needed to accommodate a variety of sizes of power strips.

FIG. 3 shows the exterior surface 16 of the main panel 12. As can be seen, for each horizontally oriented fastening strap there is a corresponding pair of apertures 54 in the main panel 12 through which the straps 38 extend. Finally, in FIG. 4, it is shown how the cover 30 attaches to the main panel 12; allowing for discreet coverage for all cordage. The cover 30 includes attachment pads for attachment to the pads 28 found on the protrusions 24, 26. The cover is a made of a heat and fire resistant material, including the embroidery, the fabric, the thread and the hook and loop material. Also heat and fire resistant is the plastic used to make the main panel 12.

In use, various electronic equipment can have the cords stored in the organizer 10. Through each horizontally oriented strap 38 can be wrapped a variety of cords, including those that connect accessories to computers or power cords. Power cords with transformers can have the transformers rest on the shelf 40 and stacked one on top of the other and held in place with the vertically oriented straps 44, 44a. All power cords are plugged into the power strip of the type that plugs into an outlet directly from its back surface, with the power strip being placed in side of the space 50 provided. Once all cords are assembled, the entire organizer 10 can be hung on a vertical surface using the apertures 32 with nails or screws or using the adhesive attachment means 34. Once organized, any one electronic item can be removed without disturbing the security of other electronic items. Once hung, the main panel 12 can be covered with the decorative and protective cover 30.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. An electronic cordage organizer comprising:

a main panel, said main panel having an interior surface, an exterior surface, a top horizontal side, a bottom horizontal side, a first vertical side and a second vertical side;

a first protrusion having an interior surface and an exterior surface extending from said first vertical side and said top horizontal side extending in an orientation substantially perpendicular to said first vertical side;

a second protrusion having an interior surface and an exterior surface extending from said second vertical side and said top horizontal side extending in an orientation substantially perpendicular to said first vertical side;

a first fastening means located on said exterior surface of said first protrusion;

a second fastening means located on said exterior surface of said second protrusion;

a multiplicity of horizontally oriented straps having a first end and a second end, said straps containing fastening means on either side, said multiplicity of horizontally oriented strips being located substantially along said first vertical side and said second vertical side;

a shelf that protrudes out from said interior surface of said main panel in an orientation substantially perpendicular to said interior surface;

a first vertically oriented strap that extends from said shelf upward toward said top horizontal side through an aperture in said main panel;

an aperture located below said shelf for the placement therethrough of a power strip that connects directly to a power outlet; and a hanging means.

2. The organizer as defined in claim 1 further comprising a second vertically oriented strap that extends from said first vertically oriented strap toward said top horizontal side and attaching thereto through an attachment means.

3. The organizer as defined in claim 1 wherein said fastening means on said first and second protrusions is taken from the group including: hook and loop fasteners, snaps buttons and buckles.

4. The organizer as defined in claim 1 wherein said fastening means on said horizontal straps are taken from the group including: hook and loop fasteners, snaps buttons and buckles hook and loop fasteners.

5. The organizer as defined in claim 2 wherein said attachment means on said second vertical strap is taken from the group including: hook and loop fasteners, snaps buttons and buckles.

6. The organizer as defined in claim 1 wherein said hanging means for said organizer is one or more apertures for the placement therethrough of screws or nails for fastening to an external surface.

7. The organizer as defined in claim 1 wherein said hanging means for said organizer is an adhesive.

8. The organizer as defined in claim 1 wherein said hanging means for said organizer is a hook and loop system.

9. The organizer as defined in claim 1 wherein a cover is attached to said organizer to said first and second fastening means located on said exterior surfaces of said first and second protrusions.

10. The organizer as defined in claim 9 wherein said cover is made of a material that is fire and heat resistant.

11. The organizer as defined in claim 9 wherein said cover is decorative.

\* \* \* \* \*